(12) United States Patent
Biester

(10) Patent No.: US 7,172,169 B2
(45) Date of Patent: Feb. 6, 2007

(54) ACTUATING DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 434 days.

(21) Appl. No.: 10/415,419

(22) PCT Filed: Oct. 30, 2001

(86) PCT No.: PCT/EP01/12551

§ 371 (c)(1),
(2), (4) Date: Oct. 1, 2003

(87) PCT Pub. No.: WO02/39203

PCT Pub. Date: May 16, 2002

(65) Prior Publication Data

US 2006/0048602 A1    Mar. 9, 2006

(30) Foreign Application Priority Data

Oct. 30, 2000   (DE)  .......................... 200 18 564 U

(51) Int. Cl.
*F16K 31/02*   (2006.01)
(52) U.S. Cl. ................................. 251/129.11
(58) Field of Classification Search ........... 251/129.11, 251/129.12, 129.13
See application file for complete search history.

(56) References Cited

U.S. PATENT DOCUMENTS 2,387,800 A * 10/1945 Leland et al. ................. 318/14
3,083,423 A * 4/1963 Hartley ........................ 366/17
4,179,944 A * 12/1979 Conner ....................... 74/89.26
4,199,132 A * 4/1980 deMey, II .............. 251/129.07
5,195,721 A * 3/1993 Akkerman ............. 251/129.13
5,649,451 A   7/1997 Ruland ....................... 74/424.8
5,879,597 A * 3/1999 Urbanek ..................... 264/40.1
6,047,104 A * 4/2000 Cheng ......................... 388/835
6,095,487 A * 8/2000 Waber ................... 251/129.11

FOREIGN PATENT DOCUMENTS

EP           1024422 A1    8/2000
WO      WO 98/30816       7/1998

* cited by examiner

*Primary Examiner*—Justine R. Yu
*Assistant Examiner*—Andrew J. Rost
(74) *Attorney, Agent, or Firm*—Conley Rose, P C

(57) ABSTRACT

An actuating device for regulating a control mechanism which is subject to a force against the direction of regulation. The actuating device includes a drive device which has a drive shaft and is connected in a moveable manner to a rotating spindle, by which means an actuating element can be axially displaced in the direction of regulation, in a housing receiving the device. The aim of the invention is to improve one such actuating device in such a way that actuation of the control mechanism is guaranteed in a constructively simple and cost-effective manner. In order to achieve this, the drive device comprises at least two electric motors which can respectively be actuated and controlled for the rotation of the drive shaft.

25 Claims, 3 Drawing Sheets

ACTUATING DEVICE

BACKGROUND OF THE INVENTION

The invention relates to an actuating device for regulating a control mechanism which is subjected to a force against the direction of regulation. Said actuating device comprises a drive device which has a drive shaft and is connected in a moveable manner to a rotating spindle, by which means an actuating element can be axially displaced in the direction of regulation, in a housing receiving the device.

Such an actuating device is, for example, known from EP 1 024 422. Such actuating devices are used especially for regulating control devices such as valves, throttle devices and other control mechanisms, especially in applications in oil and gas production. The actuating device is used for maritime and terrestrial locations which may be remote or have difficult access. By displacing the actuating element using the rotating spindle, a valve, for example, is closed or appropriately opened as a control device. Generally in this connection, such a valve is subjected to a force in the direction of the open position, produced by a spring element or similar. To regulate the rotating spindle, it is connected in a movable manner to a drive shaft which is driven by a drive device for regulating the rotating spindle and correspondingly the actuating element in the regulation direction. The actuating device comprises a device housing in which essentially all parts of the actuating device are accommodated and protected against harsh ambient effects in appropriate regions of deployment of the actuating device.

Generally, the point of use of such actuating devices is positioned remotely to the associated monitoring and motor control device and additionally it is usually difficult to access, such as for example, with maritime oil and gas production in which the actuating device and the associated control device are located on the sea bed. In order to be able to operate the control device even during a failure or with insufficient effect from the actuating device, a second independent actuating device can be assigned to the same control device. This means that with the failure of one actuating device the other one is employed and remotely operated appropriate to the actuation of the control device.

The constructive complexity and financial cost for the arrangement of two actuating devices for only one control device is quite high. In addition, in this case both actuating devices must be maintained and installed at the location of use, whereby often insufficient space is available.

The object of the application is therefore to improve an actuating device of the type mentioned at the beginning such that actuation of the control device is ensured in a constructively simple and less expensive manner.

U.S. Pat. No. 4,179,944 shows an actuating device with a drive shaft for driving a throttle. The drive shaft is arranged displaceable within a guide sleeve, whereby suitable balls are provided between these two as a bearing. The drive shaft can be withdrawn by rotating a motor and fed forward by rotating a second motor. Appropriate armature windings are provided for both motors and an additional device for fixing a spindle nut is provided between the motors.

In the normal operating mode the armature windings of the motors are separate from one another, whereby a suitable locking pin engages the spindle nut. With the occurrence of a fault, one motor rotates in the clockwise direction and the other motor in the counter-clockwise direction so that the corresponding armature windings move towards one another to move the locking pin into a release position. Then, the spindle nut can move in the longitudinal direction of the drive shaft.

Accordingly, both motors are not used to mutually substitute one another, to move the drive shaft in both directions of rotation or, should the occasion arise, to drive the drive shaft together in both directions of rotation.

The object of the application is therefore to improve an actuating device of the type mentioned at the beginning such that actuation of the control device is ensured in a constructively simple and less expensive manner.

BRIEF SUMMARY OF THE PREFERRED EMBODIMENTS

The object is solved according to the invention in that the drive device comprises at least two independent electric motors which can respectively be actuated and controlled for the rotation of the drive shaft.

Through the use of at least two electric motors it is ensured that with the failure of one motor the other one continues to drive the drive shaft in order to move the rotating spindle and the actuating element appropriately in the regulating direction. All other parts of the actuating device are present in the usual numbers and only the number of electric motors is doubled. According to the invention, a second drive shaft is also not needed on which the second electric motor acts and through which it controls the rotating spindle and actuating element. As a consequence, overall the actuating device according to the invention is in its dimensions essentially unchanged with respect to the previously known actuating device. Alternatively, both motors are used simultaneously, if, for example, a higher driving force is needed.

An especially simple and space-saving arrangement can be seen in that the electric motors are arranged one behind the other in the longitudinal direction of the drive shaft.

In order to be able to control each of the electric motors individually and essentially independently of one another, a dedicated motor control device can be assigned to each motor. The said motor control device contains a suitable microprocessor, memory devices and similar devices. Each of the electric motors can be operated according to requirements through an appropriate software program using the microprocessor.

In order to achieve a very accurate motion control with high reliability and high efficiency of the electric motors, the said motors can be realized as servomotors.

In order to obtain a bearing mechanism of high quality and high efficiency which is at the same time reversible in its movement in a simple manner, a rotating sleeve can be driven by a drive shaft via a transmission device, the said rotating sleeve being rotationally rigidly connected to a ball nut of a feed device, whereby the rotating spindle formed as a recirculating ball spindle for movement in the regulating direction is rotationally supported in the ball nut. In this way the drive force of the electric motors is transferred to the ball nut via the rotating sleeve. The said ball nut rotates together with the rotating sleeve and with the suitable rotation the recirculating ball spindle is moved in the regulating direction and consequently also the actuating element. It is also possible that instead of the previously described ball screw drive a roller screw drive is analogously applied.

In order to prevent reactions by the control device, which is subjected to force in the direction opposite to the regulating direction, via the actuating element and rotating spindle or recirculating ball spindle on the electric motors, the rotating sleeve can be fixed by a first spiral spring opposing a feed rotational direction on a ring flange rotationally rigidly arranged in the device housing. The feed rotational direction corresponds here to a rotation of the recirculating ball spindle for the regulation of the actuating element or the rotating spindle in the regulating direction.

A constructively simple way of arranging such a ring flange can be seen in that the said ring flange sticks out from a transverse wall in the device housing essentially coaxially to the drive shaft or to the rotating sleeve.

In order to enable resetting of the actuating element in the direction opposing the regulating direction despite this when the control of the actuating device fails, a retaining sleeve can be rotationally rigidly connected at one of its ends to the transverse wall, whereby the retaining sleeve is rotationally rigidly connected at its other end via a second spiral spring to a guide sleeve in the direction opposite to the feed rotational direction, the actuating element connected to the recirculating ball spindle being supported for longitudinal displacement, but rotationally rigidly in the said guide sleeve. If this second spiral spring is released during a failure of the usually provided control for the actuating device, the guide sleeve can rotate in the direction opposite to the feed rotational direction due to the force which is transferred via the actuating element and which is acting on the control device to be actuated. Through this rotation the rotating spindle is turned back in the recirculating ball nut also in the direction opposite to the regulating direction until the actuating element is again arranged in its initial position.

In this connection, in order to prevent the actuating element itself from being rotated in the direction opposite to the regulating direction when being displaced, a spindle head for mutual connection can be arranged between the said actuating element and the recirculating ball spindle. The actuating element is decoupled with regard to rotation from the recirculating ball spindle by this spindle head.

In order to enable appropriate guidance and retention with regard to the guide sleeve as mentioned above, the spindle head can comprise at least one guide element protruding radially outwards, which engages a longitudinal guide running in the guide sleeve in the regulating direction.

In order to wind up the second spiral spring for the rotationally rigid connection of the retaining sleeve and guide sleeve sufficiently tightly on them, the said spring can be drive-connected to at least one electric motor. A sufficiently rotationally rigid connection between the retaining sleeve and the guide sleeve is produced by suitable actuation of the electric motor for winding up the spiral spring, especially before regulation of the recirculating ball spindle and actuating element.

In order to be able to accommodate the appropriate electric motor at a convenient point within the device housing, the electric motor can be drive-connected to a clamping sleeve from which a dog protrudes radially inwards which can be motion-connected to essentially one end of the second spiral spring. Due to the arrangement of the clamping sleeve, the electric motor can be located remotely with respect to the second spiral spring. Here, the arrangement is preferably realized such that a space available in the device housing is optimally used.

In order to be able to arrange the actuating device suitably compact and with small outer dimensions, the clamping sleeve can be rotationally supported on an external side of the retaining sleeve and on an external side of a ring flange which engages in the device housing, whereby the ring flange protrudes from an inner side of a housing cover.

A simple type of drive connection between the electric motor and clamping sleeve can be seen in that the electric motor drives a gearwheel which engages teeth on especially one end of the clamping sleeve.

In order to achieve redundancy also in connection with the drive of the clamping sleeve, another electric motor can be arranged, especially diametrically opposed to the first electric motor, through which a gearwheel that meshes with the teeth can be driven. In this way the clamping sleeve can be alternatively driven by the first or second electric motor and especially with the failure of one electric motor the other one is used.

In order to be able to still release the second spiral spring with the failure of both electric motors, a torsion spring can be arranged between the clamping sleeve and ring flange, the said torsion spring being able to be tensed during the rotation of the clamping sleeve for winding up the second spiral spring. If therefore the clamping sleeve is no longer held by one of the electric motors during the failure of its electrical supply in such a position in which the second spiral spring is wound up, the torsion spring rotates back the clamping sleeve at least so far that the second spiral spring is relieved for the release of the rotationally rigid connection between the retaining sleeve and the guide sleeve.

In order to be able to finely and accurately control the rotation of the clamping sleeve, the first and second electric motors can be stepper motors.

In order to supply the motors of the actuating device with electricity also independently of one another at least two separate electrical connections are arranged on the device housing and especially on the housing cover adjacent to the electric motors. The appropriate voltage supply as well as the data interchange or interchange of control signals can be implemented via these electrical connections. Each of the electrical connections can be provided for one of the electrical motors, i.e. servomotors. In this connection it is also possible that each of the electrical connections is assigned to a stepper motor. A further possibility is also the provision of separate electrical connections for the stepper motors.

According to the invention, there is the possibility that the two electric motors can be controlled independently of one another for the separate drive of the drive shaft. In this case it is practicable to operate one of the electric motors in the idling mode when the other drives the drive shaft.

However, in order to be able to transfer a higher torque to the drive shaft when necessary and therefore to displace the actuating element in the regulating direction with a higher force, both electric motors (servomotors) can be operated simultaneously.

In this case, in order to prevent the motors from rotating the drive shaft with a phase displacement due, for example, to different motor characteristics or due to the formation of the separate electrical supply for both motors instead of providing mutual support during simultaneous operation, the servomotors can be especially synchronized by software via their associated motor control devices.

A simple type of synchronization and control can be seen in that one servomotor is used as the master and the other as the slave.

It can be seen as being advantageous, especially for the transmission of a high torque if each of the servomotors is a direct current motor.

For the further monitoring of the actuating device according to the invention, especially remotely from said actuating device, a position sensor can be assigned to the drive shaft. With the said sensor it can be found, for example, how far the actuating element has been regulated, whether it has returned to its initial position, etc.

BRIEF DESCRIPTION OF THE DRAWINGS

In the following an advantageous embodiment of the invention is explained in more detail and described based on the enclosed figures in the drawing.

The following are shown.

DETAILED DESCRIPTION OF THE PREFERRED EMBODIMENTS

Figure 1:
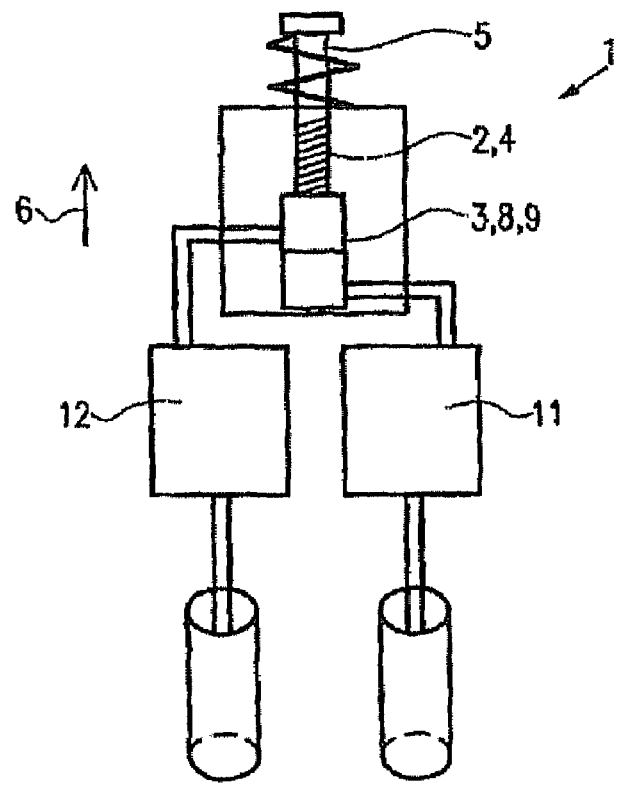
FIG. 1 shows a basic illustration of the actuating device according to the invention with two separate electric motors and associated control device.

FIG. 1 shows the basic principle of the actuating device 1 according to the invention with two separate electric motors 8, 9 as drive device 3. The electric motors 8, 9 are realized as direct current servomotors and are both used, where necessary, independently of one another for rotating a drive shaft 2. As shown in the following figures, when the drive shaft 2 is rotated, a rotating spindle 4 is displaced in the regulating direction 6 and accordingly an actuating element 5 connected to it is also displaced. The actuating element 5 is used, for example, for closing or opening a valve as control device (not shown) to be actuated by the actuating device 1.

The servomotors 8, 9 are each electrically connected to a dedicated motor control device 11 or 12. These devices comprise appropriately a microprocessor, a memory device and other components necessary for the control. An appropriate software program for controlling the servomotors is held in the motor control devices.

Figure 2:
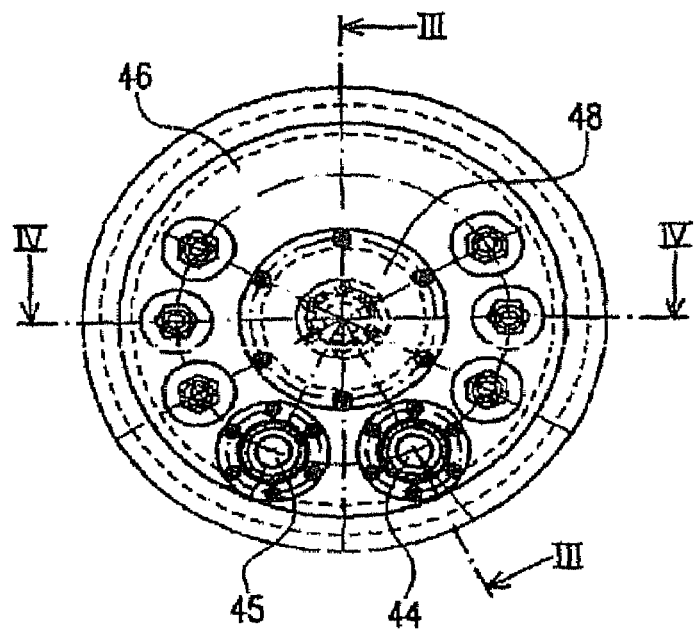
FIG. 2 shows a front view of a housing cover of the actuating device according to the invention.

Each of the motor control devices 11, 12 can be separately connected to the actuating device 1 via suitable connections 44, 45 (see for example FIG. 2). In addition, each of the motor control devices 11, 12 is connected to a suitable voltage supply.

Figure 3:
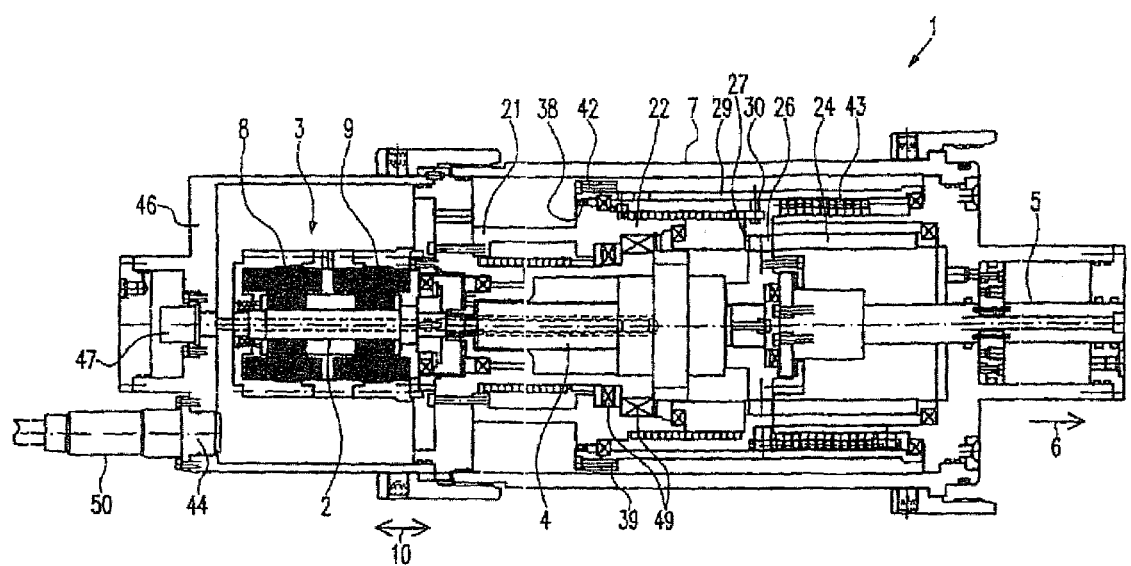
FIG. 3 shows a cross-section along the line III—III from FIG. 2.
Figure 4:
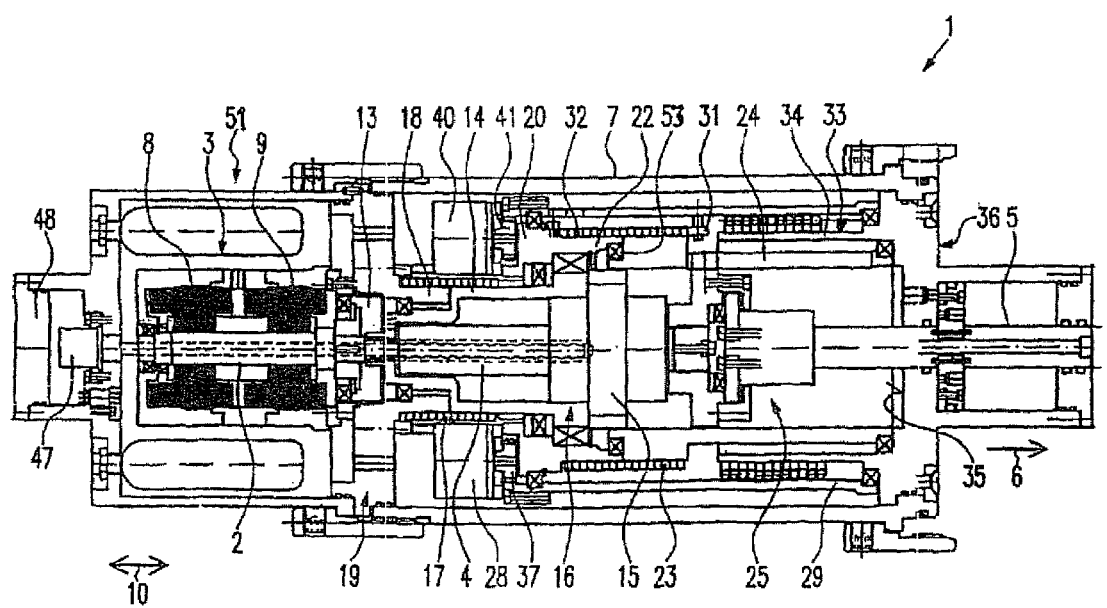
FIG. 4 shows a cross-section along the line IV—IV from FIG. 2.

FIG. 2 shows a front view of a housing cover 46 of a device housing 7, see FIGS. 3 and 4, of the actuating device 1 according to the invention. The housing cover 46 can also be realized as the end of a subhousing, see FIGS. 3 and 4, which can be releasably connected to the rest of the device housing 7.

In the housing cover 46 especially the connections 44, 45 for the electrical supply and control of the servomotors 8, 9 are arranged. A smaller cover 48 is arranged centrally with respect to the housing cover 46, the said smaller cover covering a pot-shaped protrusion of the housing cover 46, see again FIGS. 3 and 4, in which a position sensor 47 is located.

FIG. 3 shows a section along the line III-IIII and FIG. 4 shows a section along the line IV—IV from FIG. 2.

In the following the actuating device 1 according to the invention is described based on both of the FIGS. 3 and 4.

The two servomotors 8, 9 of the drive device 3 are arranged in the longitudinal direction 10 of the drive shaft 2 one behind the other. The drive shaft 2 extends adjacent to the position sensor 47. The said sensor is used to measure rotation of the drive shaft 2 and therefore for the determination of a feed of the actuating element 5 in the regulating direction 6.

The drive shaft 2 terminates in a transmission device 13, which, for example, can be realized as a so-called flex-spline gearbox without classical gearwheels. A rotating sleeve 14 is rotated by the drive shaft 2 via the transmission device 13, the said rotating sleeve being rotationally rigidly connected to a ball nut 15 as part of a feed device 16. A further part of the feed device 16 is formed by the rotating spindle 4 which is realized as a recirculating ball spindle.

A spindle head 25 is arranged on one end of the rotating spindle 4 which protrudes from the ball nut 15. The actuating element 5 is connected to the said spindle head on its side opposite the rotating spindle 4. The rotating sleeve 14 is rotationally supported in the ball bearing 49 with respect to a retaining sleeve 20 which surrounds the rotating sleeve. The rotating sleeve 14 is inserted into a ring flange 18 at its end facing the transmission device 13.

A first spiral spring 17 is wound up on the outer sides of the ring flange 18 and the rotating sleeve 14. The said spring is used to provide the rotationally rigid connection of the ring flange 18 and the rotating sleeve 14 in a rotational direction opposite to the feed rotational direction of the rotating sleeve 14, i.e. the direction of rotation through which both the rotating spindle 4 and also the actuation element 5 are displaced in the regulating direction 6.

The ring flange 18 protrudes essentially coaxially to the drive shaft 2, respectively rotating spindle 4 from a transverse wall 19. The said wall is arranged in the region of the device housing 7 where it is releasably connected to the subhousing 51.

A retaining sleeve 20 is rotationally rigidly connected to the transverse wall 19 radially outwards relative to the ring flange 18, see especially FIG. 3. The rotationally rigid connection is realized by screwing one end 21 of the retaining sleeve 20 to the transverse wall 19. The retaining sleeve 20 extends up to its end 22 which faces away the transverse wall 19. The said retaining sleeve is rotationally supported relative to a guide sleeve 24 on this said end via a ball bearing 53. A second spiral spring 23 is wound up on the outsides of both the retaining sleeve and also the guide sleeve 24.

The guide sleeve 24 extends to a housing cover 36 through which the actuating element 5 is passed. The guide sleeve 24 exhibits longitudinal guides 27 running in the regulating direction 6 and in which guide elements 26 engage. The said guide elements protrude outwards radially from the spindle head 25.

In the region of the longitudinal guides 27 the guide sleeve 24 is inserted into a ring flange 34 which protrudes from an inner side 35 of the housing cover 36. A clamping sleeve 29 is rotationally supported by suitable bearings on an external side 33 of the ring flange 34 and on an external side 32 of the retaining sleeve 20. The clamping sleeve 29 is releasably connected at its end 39 facing the drive device 3 by screwing to a toothed ring 42. The toothed ring 42 exhibits inner teeth as tooth system 38 which engages the gearwheels 37, 41. The gearwheel 37 can be rotated by a first electric motor 28 and the other gearwheel 41 by a second electric motor. The electric motors 28, 40 are realized as stepper motors.

A dog 30 protrudes radially inwards approximately centrally to the clamping sleeve 29 and said dog can be coupled to one end 31 of the second spiral spring 23, so that, depending on the rotation of the rotating sleeve 14, the second spiral spring 23 can be wound up more or less on the retaining sleeve 20 and the guide sleeve 24.

A torsion spring 43 is arranged between the clamping sleeve 29 and ring flange 34. The said spring can be clamped between the ring flange 34 and the rotating sleeve 14 when the clamping sleeve 29 is rotated for winding up the second spiral spring 23.

In the following the function of the actuating device according to the invention is briefly explained based on the enclosed figures.

Since the servomotors 8, 9 are mounted on the drive shaft 2, they can be used singly as well as in combination. Single application occurs especially when one of the servomotors 8, 9 is to replace the other one. Common actuation of both servomotors 8, 9 is especially then provided when a higher torque is to be transferred onto the drive shaft 2, which may amount to twice the torque which can be transferred by one servomotor.

Both servomotors 8, 9 are connected via separate feed cables, see the connections 44, 45, and the partially illustrated connection line 50, to their respective motor control devices 11, 12. One of the servomotors 8, 9, or both motors can be actuated and controlled via these control devices and separate electrical supplies to the motor control device and also to the servomotors.

The motor control devices 11, 12 are especially formed in that one of the servomotors is wired as the master and the other as the slave and synchronization of both motors to the common drive of the drive shaft 2 occurs by software.

The electric motors 28, 40, formed as stepper motors, are also arranged double in order to substitute one of the stepper motors with failure, damage or a similar condition. Also in this case, the control of the stepper motors occurs independently of one another over dedicated feed cables and dedicated motor control devices.

Otherwise the actuating device according to the invention functions as follows:

The ball nut 15 is rotated through the rotating sleeve 14 by rotating the drive shaft 2. Since the said ball nut is fixed in the axial direction relative to the device housing 7, the rotating spindle 4 is displaced in the regulating direction 6 when the ball nut 15 is rotated. The actuating element 5 is also displaced at the same time as the rotating spindle 4, because the said actuating element is connected to the rotating spindle 4 via the spindle head 25. The displacement of the actuating element 5 can be measured via the position sensor 47.

The force applied to the actuating element from the direction of the control device, which is not illustrated, in the opposite direction to the regulating direction 6 is transferred via the first spiral spring 17 from the rotating sleeve 14 to the ring flange 18 and therefore to the housing 7.

For resetting the actuating element 5 in the opposite direction to the regulating direction 6, the second spiral spring 23 is released via the dog 30, the said spiral spring holding the guide sleeve 24 with the retaining sleeve 20 rotationally rigid in the direction opposite to the feed rotational direction. With the second spiral spring 23 released, the guide sleeve 24 can rotate in the direction opposite the feed rotational direction, whereby the rotation onto the guide sleeve 24 is transferred via the guide elements 26 of the spindle head 25 corresponding to the reverse rotation of the rotating spindle.

If due to the failure of both stepper motors 28, 40 a release of the second spiral spring 23 is not possible, the release of the spiral spring 23 occurs through the torsion spring 43, which was tensed on winding up the second spiral spring 23 for the rotationally rigid connection of the guide sleeve 24 and retaining sleeve 20 between the clamping sleeve 29 and the ring flange 34.

The invention claimed is:

1. An actuating device for regulating a control mechanism subjected to a force against the direction of regulation, whereby the actuating device comprises:
    a drive shaft;
    a rotating spindle spaced axially apart from and connected in a moveable manner to said drive shaft;
    an actuating element adapted to be axially displaced by said rotating spindle in the direction of regulation;
    at least two electric motors, each motor adapted to be actuated and controlled both individually and in co-operation, each of the at least two electric motors being capable of rotating said drive shaft in a feed direction; and
    a housing adapted to receive the actuating device.

2. The actuating device according to claim 1, wherein said electric motors are arranged one behind the other in both directions of rotation in the longitudinal direction of said drive shaft.

3. The actuating device according to claim 1, further comprising a dedicated motor control device is assigned to each of said electric motors.

4. The actuating device according to claim 1, wherein said electric motors are servomotors.

5. The actuating device according to claim 1, further comprising a rotating sleeve adapted to be driven by said drive shaft via a transmission device and rotationally rigidly connected to a ball nut of a feed device, wherein said rotating spindle is a recirculating ball spindle and is rotationally supported in the ball nut for movement in the regulation direction.

6. The actuating device according to claim 5, further comprising:
    a ring flange rotationally rigidly arranged in said housing; and
    a first spiral spring attached to said rotating sleeve and said ring flange so as to prevent rotation of said rotating sleeve in a direction opposite the feed direction.

7. The actuating device according to claim 6, wherein said ring flange protrudes from a transverse wall in said housing and is essentially coaxial to said drive shaft and said rotating sleeve.

8. The actuating device according to claim 7, further comprising:
    a retaining sleeve rotationally rigidly connected at the first end to the transverse wall of said housing;
    a guide sleeve adapted to allow longitudinal displacement and limit rotational displacement of said actuating element;
    a second spiral spring attached to the second end of said retaining sleeve and said guide sleeve so as to prevent rotation of said guide sleeve opposite the feed direction.

9. The actuating device according to claim 8, wherein said actuating element is connected to the recirculating ball spindle via a spindle head.

10. The actuating device according to claim 9, wherein the spindle head comprises at least one guide element, protruding radially outwards; and adapted to engage a longitudinal guide disposed on said guide sleeve and running along the regulating direction.

11. The actuating device according to claim 10, wherein said second spiral spring is drive-connected to a first stepper motor.

12. The actuating device according to claim 11, wherein the first stepper motor is drive-connected to a clamping sleeve from which a dog protrudes radially inwards, the dog being connected to one end of the second spiral spring.

13. The actuating device according to claim 12, wherein the clamping sleeve is rotationally supported on an outer side of the retaining sleeve and an outer side of a ring flange protruding from an inner side of said cover.

14. The actuating device according claim 13, further comprising a torsion spring arranged between the clamping sleeve and the ring flange, wherein the torsion spring is tensed by rotating the clamping sleeve.

15. The actuating device according to claim 12, wherein the first stepper motor has a first gearwheel adapted to engage teeth disposed on one end of the clamping sleeve.

16. The actuating device according to claim 15, wherein a second stepper motor is arranged diametrically opposite the first stepper motor and is adapted to drive a second gearwheel adapted to engage the teeth on the clamping sleeve.

17. The actuating device according to claim 16, wherein the teeth are formed by a toothed ring with inner teeth, wherein the toothed ring is releasably mounted on the end of the clamping sleeve.

18. The actuating device according to claim 1, wherein the at least two electric motors can be actuated and controlled independently of one another.

19. The actuating device according to claim 1, wherein the at least two electric motors are stepper motors.

20. The actuating device according to claim 1, wherein at least two separate electrical connections are arranged on the housing cover adjacent to the electric motors.

21. The actuating device according to claim 1, wherein both electric motors can be operated simultaneously.

22. The actuating device according to claim 1, wherein the electric motors are synchronized by software via their motor control devices.

23. The actuating device according to claim 1, wherein one electric motor is used as the master and the other electric motor is used as the slave.

24. The actuating device according to claim 1, wherein the electric motors are direct current motors.

25. The actuating device according to claim 1, further comprising a position sensor assigned to the drive shaft.

* * * * *